United States Patent
Xie

(10) Patent No.: US 9,651,404 B2
(45) Date of Patent: May 16, 2017

(54) OPTICAL ENCODER HAVING AN OPTICAL PORTION COMPRISING DUAL LENSES AND AN APERTURE PORTION POSITIONED IN RELATION TO A MOIRÉ GRATING

(71) Applicant: Mitutoyo Corporation, Kanagawa-ken (JP)

(72) Inventor: Yong Xie, Redmond, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 69 days.

(21) Appl. No.: 14/869,347

(22) Filed: Sep. 29, 2015

(65) Prior Publication Data
US 2017/0089737 A1    Mar. 30, 2017

(51) Int. Cl.
*G01D 5/347*    (2006.01)
*G01D 5/26*    (2006.01)

(52) U.S. Cl.
CPC ......... *G01D 5/34707* (2013.01); *G01D 5/266* (2013.01)

(58) Field of Classification Search
CPC ........... G01D 5/34715; G01D 5/34792; G01D 5/2455; G11B 7/12
USPC ............................................. 250/231.13, 239
See application file for complete search history.

(56) References Cited

U.S. PATENT DOCUMENTS

| 5,726,442 A | * | 3/1998 | Henshaw | ................. G01D 5/38 |
| | | | | 250/226 |
| 7,186,969 B2 | | 3/2007 | Shimomura et al. | |
| 7,307,789 B2 | | 12/2007 | Mizutani | |
| 7,435,945 B2 | | 10/2008 | Shimomura et al. | |
| 8,309,906 B2 | | 11/2012 | Kapner et al. | |

* cited by examiner

*Primary Examiner* — Que T Le
(74) *Attorney, Agent, or Firm* — Seed Intellectual Property Law Group LLP

(57) ABSTRACT

An optical encoder comprises an illumination source, a scale grating extending along a measuring axis direction, an optical portion, a moiré grating, and a detector portion. The optical portion comprises an aperture portion for spatial filtering of scale light from the scale grating. The moiré grating is configured to receive the spatially filtered scale light and output a spatially modulated fringe pattern toward the detector portion. The optical portion outputs the spatially modulated scale light to form a primary interference fringe pattern with a primary fringe pitch $P_{PF}$. The detector portion comprises at least N respective detector elements positioned to detect N respective spatial phases of the periodic spatially modulated fringe pattern, where N is an integer that is at least three, and each respective detector element has a width dimension DW that is at least as large the primary fringe pitch $P_{PF}$ along a direction of the fringe displacement.

16 Claims, 5 Drawing Sheets

Primary Fringe Pattern Intensity

Spatially Modulated Fringe Pattern Intensity

OPTICAL ENCODER HAVING AN OPTICAL PORTION COMPRISING DUAL LENSES AND AN APERTURE PORTION POSITIONED IN RELATION TO A MOIRÉ GRATING

FIELD

The present application relates generally to precision measurement instruments and more particularly to optical displacement encoders.

BACKGROUND

Various optical displacement encoders are known that use a readhead having an optical arrangement that images a scale pattern to a photodetector arrangement in the readhead. The image of the scale pattern displaces in tandem with the scale member, and the movement or position of the displaced scale pattern image is detected with a photodetector arrangement. Conventional imaging, self-imaging (also called Talbot imaging), and/or shadow imaging may be used to provide the scale pattern image in various configurations.

One type of configuration that is utilized in some optical encoders is a telecentric arrangement. U.S. Pat. Nos. 7,186,969; 7,307,789; and 7,435,945, each of which is hereby incorporated herein by reference in its entirety, disclose various encoder configurations that utilize either singly or doubly telecentric imaging systems for imaging the periodic pattern of light and sensing displacement of the periodic scale structure. Telecentric imaging systems provide certain desirable features in such optical encoders.

One issue with regard to the design of such optical encoders is that users generally prefer that the readheads and scales of the encoders be as compact as possible. A compact encoder is more convenient to install in a variety of applications. For certain precision measurement applications, high resolution is also required. However, various known encoders fail to provide certain combinations of high resolution, range-to-resolution ratio, robustness, large field of view, and design features which allow a number of encoder resolutions to be provided using shared manufacturing techniques and components, and which facilitate low cost as desired by users of encoders. Improved configurations of encoders that provide such combinations would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An optical encoder for measuring the relative displacement between two members is disclosed. The optical encoder comprises a scale grating extending along a measuring axis direction, the scale grating having a grating pitch $P_{SF}$, and a readhead configuration that moves relative to the scale grating with the relative displacement. The readhead comprises an illumination configuration comprising an illumination source, an optical portion arranged along an optical axis, a moiré grating and a detector portion. The optical portion may be configured to operate as an afocal optical system in some embodiments. The illumination configuration is arranged to output collimated source light with a wavelength λ toward the scale grating. The optical portion comprises a first lens having a focal length f1 and positioned at a distance of approximately f1 from the scale grating, an aperture portion positioned at a distance of approximately f1 from the first lens, and a second lens positioned having a focal length f2 and positioned at a distance of approximately f2 from the aperture. The scale grating is configured to receive the collimated source light and output diffracted scale light to the first lens. The first lens is configured to receive the scale light and focus it toward the aperture portion. The aperture portion is configured to receive the scale light, block a majority of zero order scale light, and transmit spatially filtered scale light comprising primarily +1 and −1 order scale light toward the second lens. The second lens is configured to receive the spatially filtered scale light and output the spatially filtered scale light toward the moiré grating to form a primary interference fringe pattern having fringes that extend along the direction of the optical axis and approximately parallel to bars of the moiré grating, the fringes having a primary fringe pitch $P_{PF}$ and moving with a fringe displacement corresponding to the relative displacement. The moiré grating is configured to receive the primary interference fringe pattern and transmit a periodic spatially modulated fringe pattern to the detector portion, the spatially modulated fringe pattern having an intensity modulation period or pitch $P_{MFP}$ along a direction corresponding to the measuring axis direction at a detector plane of the detector portion. The detector portion comprises at least N respective detector elements which are positioned to detect N respective spatial phases of the periodic spatially modulated fringe pattern, where N is an integer that is at least three, and each respective detector element has a width dimension DW that is at least as large as $P_{PF}$ along a direction of the fringe displacement. The modulation period $P_{MFP}$ may be significantly larger than the primary fringe pitch $P_{PF}$ and the grating pitch $P_{SF}$ in various embodiments, allowing the use of detector elements that are spaced apart at a large pitch in comparison to the scale grating pitch. In addition, a single detector portion design may be used with more than one scale grating pitch by adapting the pitch of the moiré grating.

DETAILED DESCRIPTION

Figure 1A:
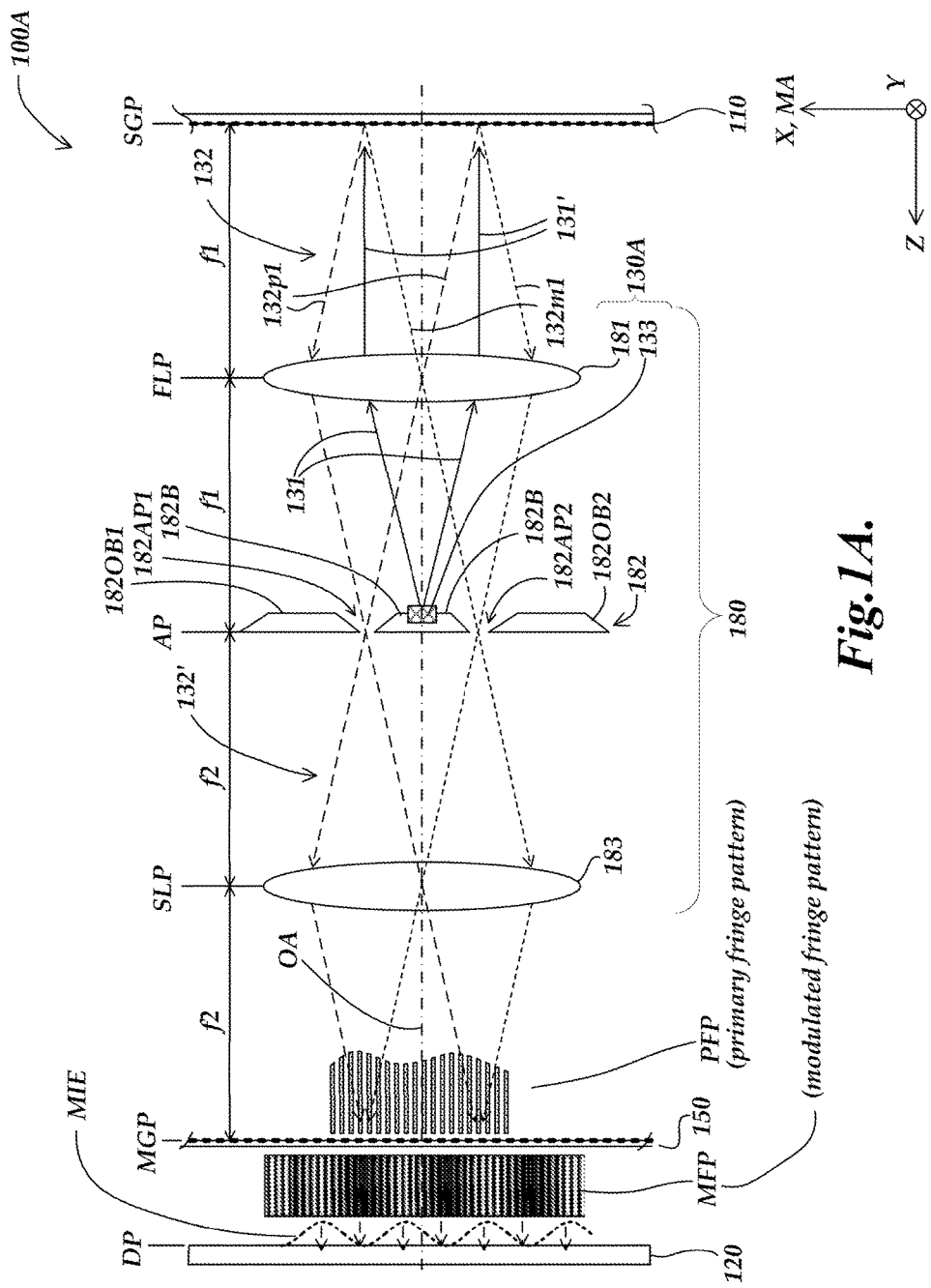
FIG. 1A is a schematic diagram of a first embodiment of an optical displacement encoder configuration.
Figure 1C:
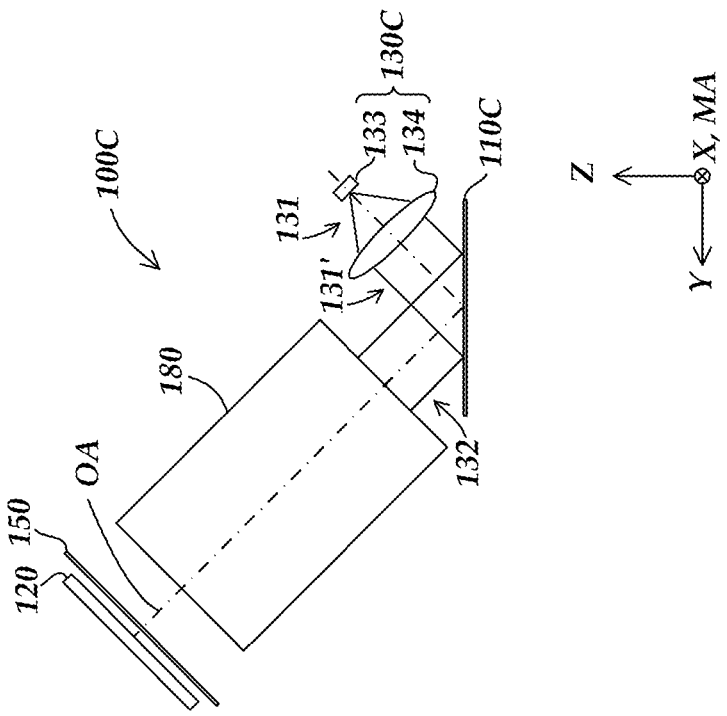
FIG. 1C is a schematic diagram of a third embodiment of an optical displacement encoder configuration.
Figure 1B:
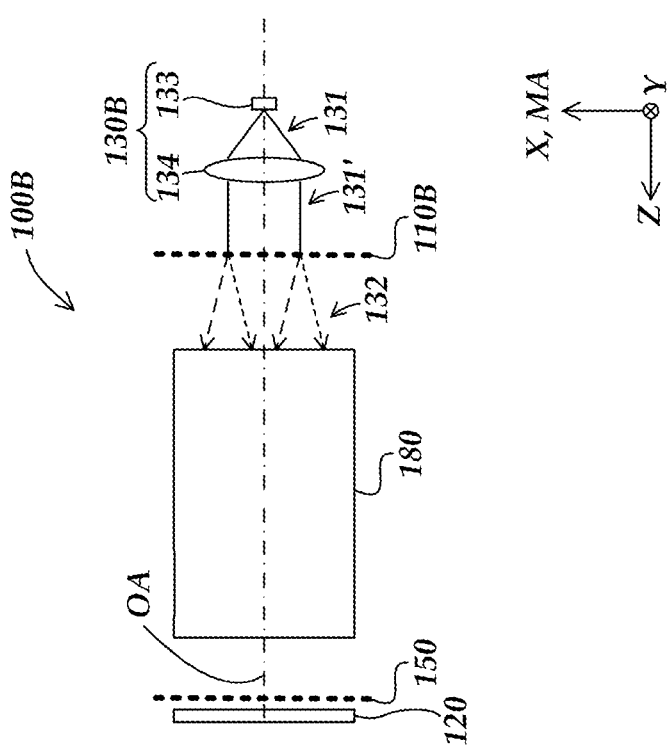
FIG. 1B is a schematic diagram of a second embodiment of an optical displacement encoder configuration.

FIG. 1A is a schematic diagram of a first embodiment of an optical displacement encoder configuration 100A for measuring the relative displacement between two members. The optical displacement encoder configuration comprises a scale grating 110 extending along a measuring axis direction MA and having a grating pitch $P_{SF}$, and a readhead configuration that moves relative to the scale grating 110 with the relative displacement. The readhead configuration comprises: an illumination configuration 130A, an optical portion 180 arranged along an optical axis OA, a moiré grating 150 and a detector portion 120. The optical portion 180 comprises a first lens 181 positioned at a first lens plane FLP, an aperture portion 182 positioned at an aperture plane AP, and a second lens 183 positioned at a second lens plane SLP. When speaking of the positioning of a lens at a distance from another object or location herein, it is generally meant the positioning of the effective plane of the lens (e.g., as though it was a very thin lens), not the position of a nearest surface of the lens. The scale grating 110 is located at a scale grating plane SGP, the moiré grating 150 is located at a moiré grating plane MGP and the detector portion 120 is located at a detector plane DP. The illumination configuration 130A comprises a light source 133, which in this embodiment may be mounted proximate to or on the aperture portion 182 approximately at the aperture plane AP, and the lens 181. In this embodiment the lens 181 provides more than one function, including acting as a collimating lens configured to output collimated source light 131' to the scale grating 110. Locating the light source 133 in this position and using the first lens 181 as a collimation element allows for a more compact encoder readhead with fewer components than a typical readhead. It will be appreciated that in an alternative embodiment a turning mirror may be similarly positioned, to redirect a focused light beam from an alternatively positioned light source toward the lens 181. Furthermore, other alternative arrangements of an illumination source may also be utilized according to the principles disclosed herein, e.g., as shown in FIGS. 1B and 1C.

The first lens has a focal length f1, and is positioned at a distance of approximately f1 from the scale grating 110. The aperture portion 182 is positioned at a distance of approximately f1 from the first lens 181. The second lens 183 is has a focal length f2, and is positioned at a distance of approximately f2 from the aperture portion 182. The moiré grating is positioned at a distance of approximately f2 from the second lens 183. In some embodiments, the focal lengths f1 and f2 may be equal, although this is not a requirement in all embodiments. In various embodiments, the optical portion 180 may operate to provide an afocal optical system that is a telecentric optical system including a spatial filter.

FIG. 1A shows orthogonal X, Y, and Z directions, according to a convention used herein. The X and Y directions are parallel to the plane of the scale grating 110, with the X direction parallel to the intended measuring axis direction MA (e.g., perpendicular to elongated pattern elements that may be included in the scale grating 110). The Z direction is normal to the scale grating plane SGP.

In operation, the illumination configuration 130A is configured to output collimated source light 131' with a wavelength λ toward the scale grating 110. In particular, the first lens 181 is configured to receive light 131 from the light source 133 and output collimated source light 131' to the scale grating 110. The scale grating 110 is configured to receive the collimated source light 131' and output (reflect) diffracted scale light 132 to the first lens 181. The diffracted scale light 132 comprises +1 order scale light represented by exemplary +1 order scale light rays 132p1 and −1 order scale light represented by exemplary −1 order scale light rays 132m1. It should be appreciated that the diffracted scale light 132 also comprises zero order and higher order diffracted scale light rays which are not shown in FIG. 1, because they are blocked and/or made inoperable by the configuration. The first lens 181 is configured to receive the scale light 132 and focus it toward the aperture portion 182. The aperture portion 182 is configured to receive the scale light 132, block a majority of zero order scale light, and transmit spatially filtered scale light 132' comprising primarily +1 and −1 order scale light toward the second lens 183. The second lens 183 is configured to receive the spatially filtered scale light 132' and output the spatially filtered scale light 132' toward the moiré grating 150 to form a primary fringe pattern PFP having "planar" fringes that extend along the direction of the optical axis OA and approximately parallel to bars of the moiré grating 150. The fringes of the primary fringe pattern PFP have a primary fringe pitch $P_{PF}$ and move with a fringe displacement corresponding to the relative displacement between the scale grating 110 and the readhead along the measuring axis MA. The moiré grating 150 is configured to receive the primary fringe pattern PFP and transmit a periodic spatially modulated fringe pattern MFP to the detector portion 120, the spatially modulated fringe pattern MFP having a modulation period $P_{MFP}$ along a direction corresponding to (e.g., in some cases parallel to) the measuring axis direction at the detector plane DP of the detector portion 120. It will be appreciated that in FIG. 1A the spatially modulated fringe pattern MFP extends everywhere between the moiré grating 150 and the detector plane DP, but is shown schematically, along with a corresponding modulated intensity envelope MIE, for purposes of explanation. The modulated intensity envelope MIE of the spatially modulated fringe pattern MFP schematically illustrates where higher intensity regions and lower intensity regions of approximately sinusoidally modulated (or filtered) light fall on the detector portion 120. The modulated intensity envelope MIE of the spatially modulated fringe pattern MFP is further described below with reference to FIG. 2C. The detector portion 120 comprises at least N respective detector elements which are positioned to detect N respective spatial phases of the periodic spatially modulated fringe pattern MFP, where N is an integer that is at least three (e.g., for a known type of 3-phase type of displacement signal processing scheme), and each respective detector element has a width dimension DW that is at least as large as the primary fringe pitch $P_{PF}$ along a direction of the fringe displacement. One embodiment of a detector portion suitable for a known type of quadrature-type displacement signal processing scheme is described in greater detail below with reference to FIG. 2D.

In the embodiment shown in FIG. 1A, the aperture portion 182 comprises an inner blocking portion 182B, open aperture portions 182AP1 and 182AP2, and outer blocking portions 182OB1 and 182OB2. The inner blocking portion 182B and the outer blocking portions 182OB1 and 182OB2 are constructed from an opaque material which blocks a portion of the scale light 132. More specifically, the inner blocking portion 182B is configured to block a 0 order portion of the scale light 132, and the outer blocking portions 182OB1 and 182OB2 are configured to block +2 order, −2 order and higher order portions of the scale light 132. The open aperture portions 182AP1 and 182AP2 may comprise either a transmissive material or an open portion of the material of the aperture portion 182. The inner blocking portion 182B and the open aperture portions 182AP1 and 182AP2 are centered about the optical axis OA.

In various embodiments, the light source 133 may comprise a laser diode or a small LED.

In various applications, the illumination configuration 130, the optical portion 180, the moiré grating 150 and the detector portion 120 are mounted in a fixed relationship relative to one another, e.g., in a readhead or gauge housing, and are guided along the measuring axis relative to the scale grating 110 by a bearing system, according to known techniques. The scale grating 110 may be attached to a moving stage, or a gauge spindle, or the like, in various applications.

In the illustrated embodiment, the scale grating 110 is an incremental scale grating which may be used in conjunction with multiple scale tracks in an absolute encoder which provides an absolute position signal. Absolute position scale structures provide a unique output signal, or combination of signals, at each position along a scale. They do not require continuous accumulation of incremental displacements in order to identify a position. One example of an absolute encoder is disclosed in U.S. Pat. No. 8,309,906 which is hereby incorporated herein by reference in its entirety.

FIG. 1B is a schematic diagram of a second embodiment of an optical displacement encoder configuration 100B. It will be appreciated that the configuration shown in FIG. 1A uses a reflective scale type configuration. In contrast, a transmissive scale type configuration is shown in FIG. 1B, which otherwise operates in a manner analogous to the embodiment shown in FIG. 1A. The optical displacement encoder configuration 100B comprises a transmissive scale grating 110B and an illumination configuration 130B comprising a light source 133 and a collimating lens 134. The transmissive scale grating 110B comprises light blocking portions and light transmitting portions (e.g., fabricated on a transparent substrate using known thin-film patterning techniques, or the like) that receive collimated source light 131' from the lens 134 of the illumination configuration 130B. The scale grating 110B then outputs diffracted scale light 132 to the optical portion 180 by transmission. In this a case, the illumination portion 130B is located on the opposite side of the scale grating from the optical portion 180 and the detector portion 120.

FIG. 1C is a schematic diagram of a third embodiment of an optical displacement encoder configuration 100C. It will be appreciated that the configuration shown in FIG. 1A uses a reflective scale type configuration wherein the optical axis is normal to the scale grating. In contrast, a reflective scale type configuration is shown in FIG. 1C, wherein the optical axis is angled away from normal in the YZ plane, but which otherwise operates in a manner analogous to the embodiment shown in FIG. 1A. The optical displacement encoder configuration 100C comprises a reflective scale grating 110C and an illumination configuration 130C comprising a light source 133 and a collimating lens 134. The illumination configuration 130C is oriented to output collimated source light 131' at a first angle (e.g., 45 degrees) in the YZ plane toward the scale grating 110C. The scale grating 110C then outputs diffracted scale light 132 to the optical portion 180 along its optical axis OA by reflection along a complementary reflection angle in the YZ plane. In this case, the illumination configuration 130C is located on the same side of the scale grating 110C as the optical portion 180 and the detector portion 120, which allows a simpler readhead and mounting configuration for the optical encoder.

Figure 2A:
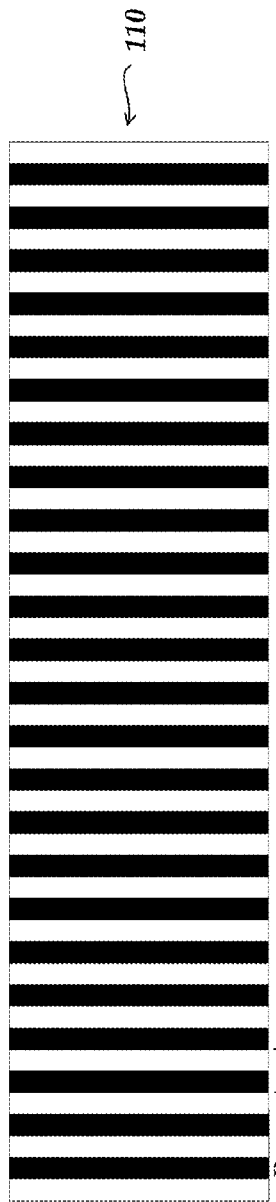
FIGS. 2A-2D illustrate various aspects related to optical signals of the optical displacement encoder configuration of FIG. 1.
Figure 2B:
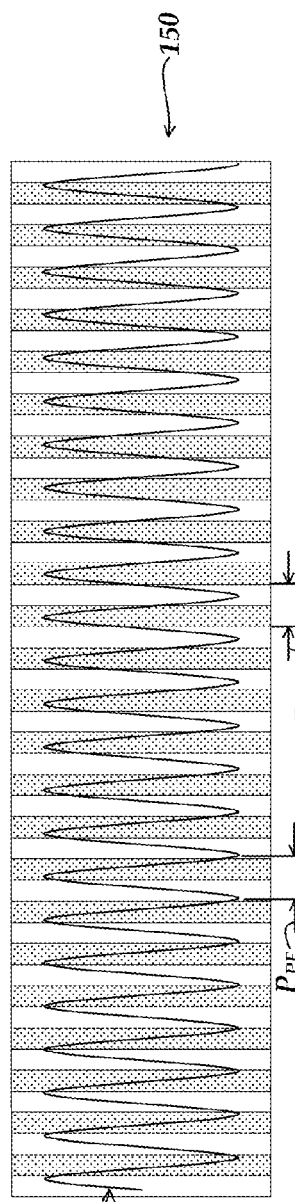

FIGS. 2A-2D illustrate various aspects related to the optical signals corresponding to the scale grating 110 of FIG. 1. More specifically, FIG. 2A illustrates the scale grating 110, which is shown to have a pitch $P_{SF}$. FIG. 2B illustrates the moiré grating 150 and a schematically illustrated intensity of the primary fringe pattern PFP of the spatially filtered source light 132' superimposed on the moiré grating 150. The moiré grating 150 is shown to have a pitch $P_M$ and the spatially filtered source light 132' is shown to form a primary interference fringe pattern (also referred to as the primary fringe pattern) which has a pitch $P_{PF}$ as schematically illustrated by the primary fringe pattern intensity curve shown in FIG. 2B.

Figure 2C:
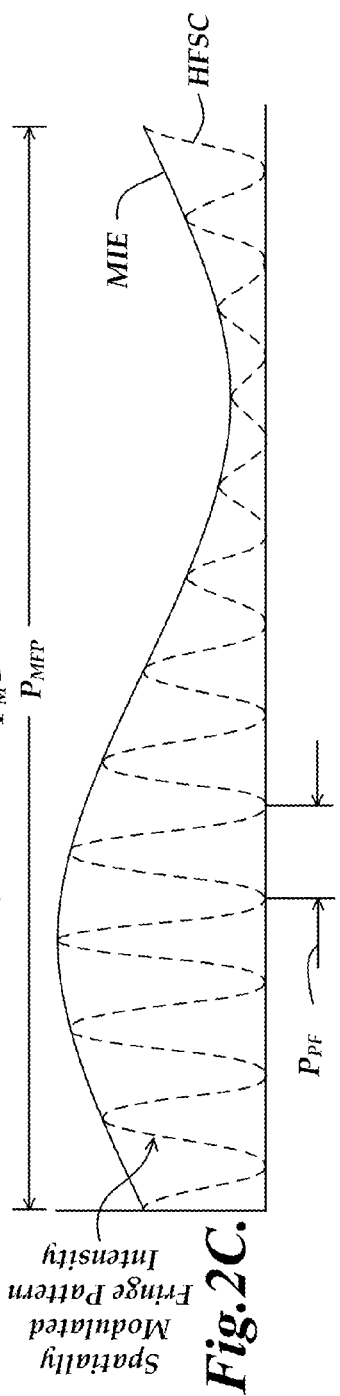

FIG. 2C is a graph of an overall sinusoidal modulated intensity envelope pattern MIE corresponding to the periodic spatially modulated fringe pattern MFP output by the moiré grating 150 (e.g., as shown in FIG. 1A). As shown in FIG. 2C, the moiré grating 150 outputs a moiré pattern (also referred to as moiré fringes) having the schematically illustrated spatially modulated fringe pattern intensity. The corresponding overall sinusoidal modulated intensity envelope pattern MIE has a modulated pattern period or pitch $P_{MFP}$ determined by a beat frequency effect, as is known for such moiré effect patterns (e.g., $P_{MFP}$ on the order of 10 microns, or 25 microns, or more in various embodiments). The spatially modulated fringe pattern intensity may include high frequency signal content (schematically shown as HFSC in FIG. 2C) which may include spatial frequencies as high as of the primary fringe pattern and/or its spatial harmonic content, for example. The high frequency signal content may be averaged out or eliminated from the detector displacement signals by using wide detector elements (e.g., wider, or much wider, than the primary fringe pitch $P_{PF}$), and/or by combining signals from a plurality of detector elements, as described in more detail with respect to FIG. 2D.

Figure 2D:
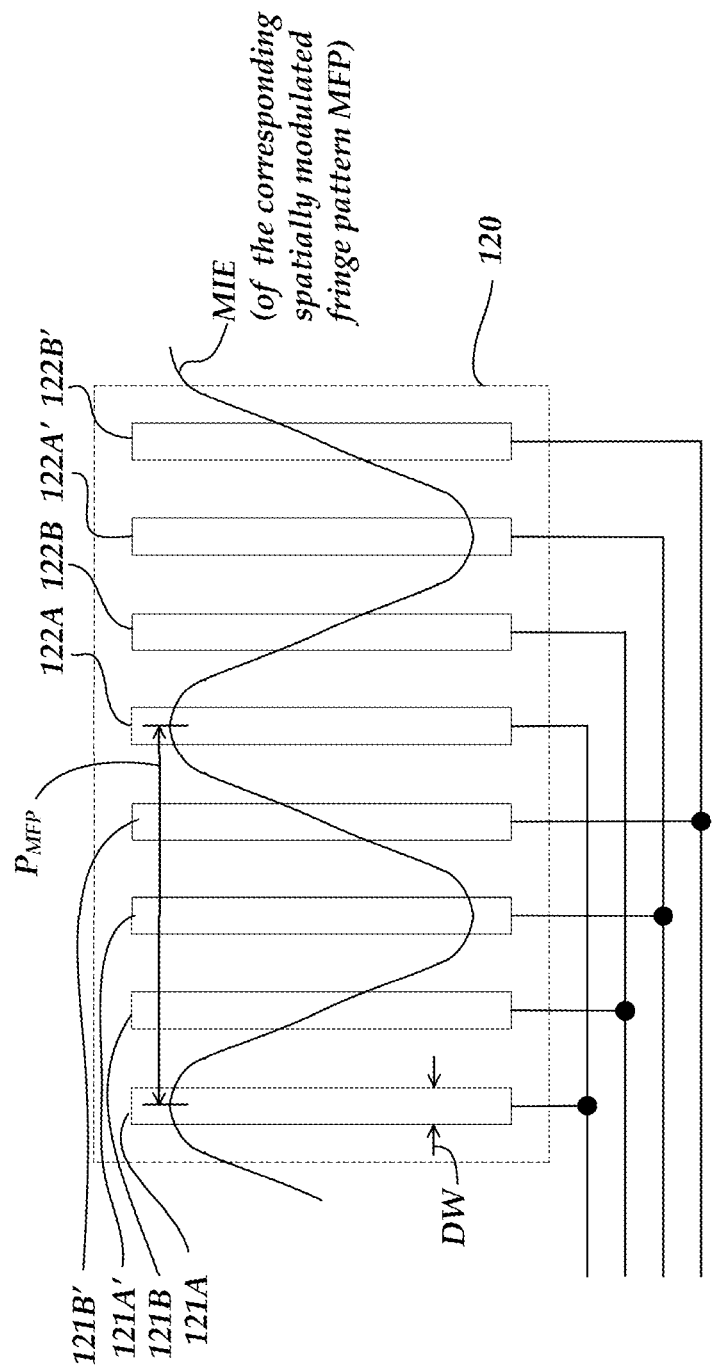

FIG. 2D is a diagram of the detector portion 120 which, for purposes of illustration, has the beat frequency or modulated intensity envelope pattern MIE of the spatially modulated fringe pattern MFP (e.g., as shown in FIG. 1A) schematically superimposed upon it. The detector portion comprises detector elements 121A, 121B, 121A', 121W, 122A, 122B, 122A', and 122W. As shown in FIG. 2D, the detector portion is configured so as to output quadrature signals, with four respective detector elements (e.g., the detector elements 121A, 121B, 121A' and 121B), being positioned to detect four respective spatial phases of the periodic spatially modulated fringe pattern MFP within the dimension $P_{MFP}$ of one period of its corresponding modulated intensity envelope pattern MIE. As shown in FIG. 2D, the detector elements 121A, 121B, 121A', 121W, 122A, 122B, 122A', and 122B' comprise individual photodetector elements or areas which are arranged to spatially filter their respective received portions of the modulated fringe pattern MFP to provide desirable position indicating signals corresponding to different spatial phases of the modulated intensity envelope pattern MIE. In some embodiments, detector elements with a similar letter and "prime" suffixes (e.g., 121A and 122A, or 121A' and 122A') may be spaced apart by an integer number of periods $P_{MFP}$ of the modulated intensity envelope pattern MIE and electrically coupled to sum signals with the same spatial phase. In various embodiments, it may be desirable for each respective detector element to have a width dimension DW that is at least as large as $P_{PF}$ (shown in FIGS. 2B and 2C) along a direction of the fringe displacement (e.g., the direction of the measuring axis direction MA, in some embodiments). In some embodiments the width dimension DW may be at least as large as $2*P_{PF}$ along the direction of the fringe displacement. In some embodiments the width dimension DW may be at least as large as $3*P_{PF}$ along the direction of the fringe displacement, or more.

In some embodiments, filtering the high frequency signal content HFSC may depend on a spacing between the detector plane DP and the moiré grating plane MGP. In some embodiments, the spacing may be less than 1 mm for optimal performance. The spacing may be determined by analysis or experiment.

In some embodiments, rather than individual photodetector areas, a spatial filter mask with individual apertures that act as detector elements that mask relatively larger photodetector areas is used to provide light receiving areas analogous to the individual photodetector elements, to provide a similar overall signal effect according to known techniques.

In some embodiments, the spatial period $P_{MFP}$ may satisfy the expression $P_{MFP}=M*P_{PF}$, where M is a magnification value which compares the period or pitch $P_{MFP}$ of the spatially modulated fringe pattern MFP (or its modulated intensity envelope pattern MIE) to the primary fringe pitch $P_{PF}$. In various embodiments, the moiré grating may comprise a pitch $P_M$ which is determined such that the modulation period $P_{MFP}$ and the primary fringe pitch $P_{PF}$ satisfy the necessary magnification M. It is desirable in various embodiments for M to have a relatively large value, (e.g., at least 5, or in some embodiments 10 or 20, or more), in order to allow the use of relatively coarse and/or inexpensive detectors and/or to average out high frequency signal content HFSC across detector elements 121A, 121B, 121A' and 121W. In the embodiment shown in FIGS. 2A-D, M has a value of approximately 25. This avoids the need for additional optical components for spatial filtering of the modulated fringe pattern MFP, as wide detector elements provide an effective filtering of the high frequency signal content HFSC, such that the modulated intensity envelope pattern MIE provides quadrature signals to the detector elements 121A, 121B, 121A' and 121W.

It should be appreciated that the detector portion 120 is shown to comprise detector elements arranged to detect four respective spatial phases of the periodic spatially modulated fringe pattern. In alternative embodiments, a detector portion may comprise detector elements arranged to detect three spatial phases or more than four spatial phases.

Figure 3:
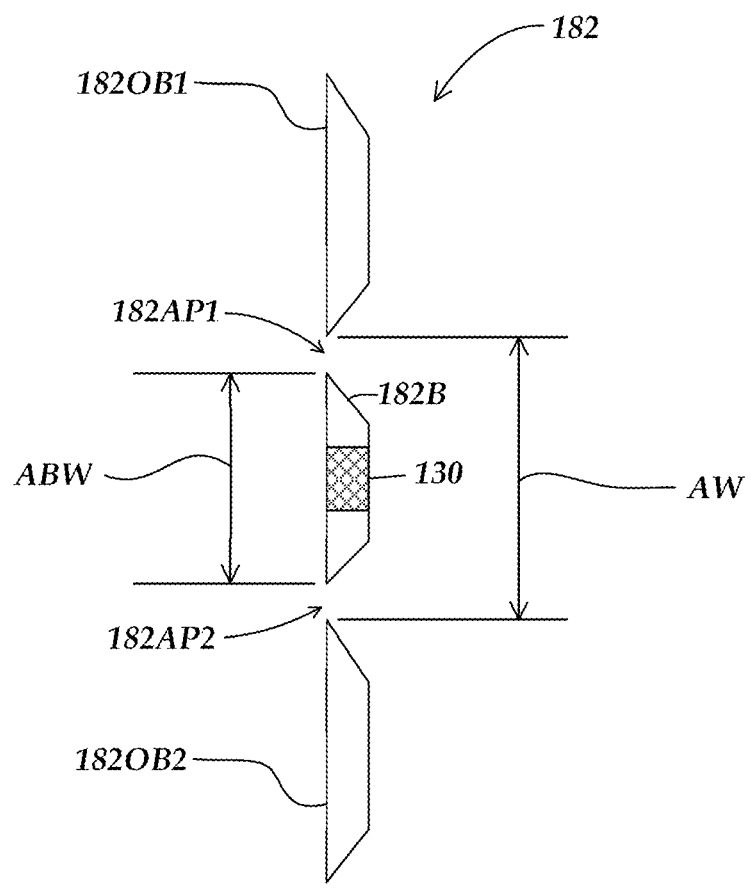
FIG. 3 is a diagram of an aperture element of the optical displacement encoder configuration of FIG. 1, showing various dimensions.

FIG. 3 is a diagram of the aperture portion 182 of FIG. 1, showing various dimensions. In the embodiment shown in FIG. 3, the aperture portion 182 comprises an inner blocking portion 182B and open aperture portions 182AP1 and 182AP2. At their widest point from an optical axis OA of the aperture portion 182, the open aperture portions 182AP1 and 182AP2 are separated by an aperture width AW. In general, to provide a strong signal to noise ratio, it is advantageous if the limiting aperture width AW is determined such that it transmits at least a majority of the +1 and −1 order scale light 132. For source light 131 having a nominal wavelength λ and a scale grating pattern 110 having a scale grating pitch $P_{SF}$, the nominal separation of the ray bundles comprising +1 and −1 order scale light 132 at the aperture plane AP depends on diffraction angles of +1 and −1 order scale light 132, the distance f between the source grating plane SGP and the first lens plane FLP. The diffraction angles are plus and minus arcsin [λ/$P_{SF}$]. In some embodiments, the limiting aperture width AW may be determined such that:

$$AW \geq KMIN * f * \tan\left(\arcsin\left[\frac{\lambda}{P_{SF}}\right]\right) \quad (1)$$

where KMIN is at least 2. In some embodiments, it may be advantageous if KMIN is at least 2.5, or at least 3, to transmit a desirable amount of the +1 and −1 order scale light 132 (e.g., in order to provide a desirable amount of image contrast). In addition, in some embodiments, the limiting aperture width AW may be determined such that:

$$AW \leq KMAX * f * \tan\left(\arcsin\left[\frac{\lambda}{P_{SF}}\right]\right) \quad (2)$$

where KMAX is at most 5. In some embodiments, it may be advantageous if KMAX is at most 4, or at most 3, or as otherwise chosen to provide a desirable amount of spatial filtering of rays that produce spatial harmonics of the scale pitch $P_{SF}$ in the resulting spatially filtered scale light 132'. When spatial harmonics are suppressed, the image intensity along the measuring axis direction MA in the spatially filtered scale light 132' is more ideally sinusoidal, which generally reduces displacement measurement errors and/or simplifies signal processing in an encoder system.

The inner blocking portion 182B has an aperture blocking width ABW. The aperture blocking width ABW of the inner blocking portion 182B should also be chosen to transmit at least a majority of the +1 and −1 order scale light 132 (e.g., in order to provide a desirable amount of image contrast). In some embodiments, the aperture blocking width ABW may be determined such that:

$$ABW \leq BMAX * f * \tan\left(\arcsin\left[\frac{\lambda}{P_{SF}}\right]\right) \quad (3)$$

where BMAX is at most 2. In some embodiments, it may be advantageous if BMAX is at most 1.5, or at most 1, to transmit a desirable amount of the +1 and −1 order scale light 132. In addition, to block most or all of the 0 order portion of the scale light 132, the aperture blocking width ABW may be determined such that:

$$ABW \geq BMIN * f * \tan\left(\arcsin\left[\frac{\lambda}{P_{SF}}\right]\right) \quad (4)$$

where, in some embodiments, BMIN is at least 0.5. In some embodiments, it may be advantageous if BMIN is at least 0.75, or at least 1, to block a desirable amount of the 0 order portion of the scale light 132.

It should be appreciated that the design of the optical encoder embodiments disclosed herein is especially suitable for a small scale grating pitch $P_{SF}$. The scale grating pitch $P_{SF}$ may be as small as 1 μm in some embodiments, or even less. A smaller scale grating pitch $P_{SF}$ results in large diffraction angles which allows for a wider spacing between diffractive orders of the scale light 132, which therefore allows for looser manufacturing tolerances of the aperture portion 182. The aperture portion 182 also allows for blocking of zero order portions of the scale light 132, which eliminates the need for expensive or complex illumination sources, or scale gratings which are more expensive transmissive phase gratings.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be The embodiments of the invention in which an exclusive property or privilege is claimed are defined as follows:

1. An optical encoder for measuring the relative displacement between two members, the optical encoder comprising:
    a scale grating extending along a measuring axis direction, the scale grating having a grating pitch $P_{SF}$; and
    a readhead configuration that moves relative to the scale grating with the relative displacement, the readhead comprising:
        an illumination configuration comprising an illumination source, the illumination configuration arranged to output collimated source light with a wavelength $\lambda$ toward the scale grating;
        an optical portion arranged along an optical axis, the optical portion comprising:
            a first lens having a focal length f1, and positioned at a distance of approximately f1 from the scale grating;
            an aperture portion positioned at a distance of approximately f1 from the first lens; and
            a second lens having a focal length f2, and positioned at a distance of approximately f2 from the aperture portion;
        a moiré grating; and
        a detector portion,
    wherein:
    the scale grating is configured to receive the collimated source light and output diffracted scale light to the first lens;
    the first lens is configured to receive the scale light and focus it toward the aperture portion;
    the aperture portion is configured to receive the scale light, block a majority of zero order scale light, and transmit spatially filtered scale light comprising primarily +1 and −1 order scale light toward the second lens;
    the second lens is configured to receive the spatially filtered scale light and output the spatially filtered scale light toward the moiré grating to form a primary interference fringe pattern having fringes that extend along the direction of the optical axis and approximately parallel to bars of the moiré grating, the fringes having a primary fringe pitch $P_{PF}$ and moving with a fringe displacement corresponding to the relative displacement;
    the moiré grating is configured to receive the primary interference fringe pattern and transmit a periodic spatially modulated fringe pattern to the detector portion, the spatially modulated fringe pattern having a modulation period $P_{MFP}$ along a direction corresponding to the measuring axis direction at a detector plane of the detector portion; and
    the detector portion comprises at least N respective detector elements which are positioned to detect N respective spatial phases of the periodic spatially modulated fringe pattern, where N is an integer that is at least three, and each respective detector element has a width dimension DW that is at least as large as the primary fringe pitch $P_{PF}$ along a direction of the fringe displacement.

2. The optical encoder of claim 1, wherein:
    the moiré grating comprises a pitch $P_M$ which is determined such that the modulation period $P_{MFP}$ and the primary fringe pitch $P_{PF}$ satisfy an expression $P_{MFP}=M*P_{PF}$; and
    M has a value which is at least 5.

3. The optical encoder of claim 2, wherein M has a value which is at least 10.

4. The optical encoder of claim 1, wherein f1 is equal to f2.

5. The optical encoder of claim 1, wherein the moiré grating is positioned at a distance approximately equal to f2 from the second lens.

6. The optical encoder of claim 1, wherein the scale grating is reflective and the illumination configuration is configured such that:
    the illumination source is positioned proximate to the aperture portion at a distance of approximately f1 from the first lens and is configured to output diverging light to the first lens; and
    the first lens is configured to receive the diverging light from the illumination source and output collimated source light to the scale grating.

7. The optical encoder of claim 1, wherein:
    the illumination configuration comprises a collimating lens;
    the illumination source is configured to output diverging light to the collimating lens; and the collimating lens is configured to receive the diverging light from the illumination source and output collimated source light to the scale grating.

8. The optical encoder of claim 7, wherein:
    the scale grating is a transmissive grating; and
    the illumination configuration is located on an opposite side of the scale grating from the optical portion and the detector portion.

9. The optical encoder of claim 7, wherein:
    the scale grating is a reflective grating;
    the illumination configuration is oriented to output the collimated source light along a first angle away from normal to the scale grating, in a plane which is parallel to grating elements of the scale grating and normal to a plane of the scale grating; and
    the optical portion is configured to receive scale light along a second angle away from normal to the scale grating, in a plane which is parallel to grating elements of the scale grating and normal to a plane of the scale grating.

10. The optical encoder of claim 1, wherein:
    the aperture portion comprises a first open aperture portion, a second open aperture portion, an inner blocking portion, a first outer blocking portion and a second outer blocking portion;
    the first open aperture portion and the second aperture portion are configured to transmit +1 and −1 order scale light;
    the inner blocking portion is configured to block a 0 order portion of the scale light;
    the first outer blocking portion and the second outer blocking portion are configured to block portions of scale light including orders which are higher order than +1 and −1 order.

11. The optical encoder of claim 10, wherein:
the inner blocking portion has an aperture blocking width ABW which satisfies the expression:

$$ABW \leq BMAX * f * \tan(\arcsin\left[\frac{\lambda}{P_{SF}}\right])$$

and
BMAX is at most 2.

12. The optical encoder of claim 11, wherein:
the width ABW satisfies the expression:

$$ABW \geq BMIN * f * \tan(\arcsin\left[\frac{\lambda}{P_{SF}}\right])$$

and
BMIN is at least 0.5.

13. The optical encoder of claim 10, wherein:
at their widest point from an optical axis of the optical portion, the first open aperture portion and the second open aperture portion are separated by an aperture width AW;
the aperture width AW satisfies the expression:

$$AW \geq KMIN * f * \tan(\arcsin\left[\frac{\lambda}{P_{SF}}\right])$$

and
KMIN is at least 2.

14. The optical encoder of claim 13, wherein:
the aperture width AW satisfies the expression:

$$AW \leq KMAX * f * \tan(\arcsin\left[\frac{\lambda}{P_{SF}}\right])$$

and
KMAX is at most 5.

15. The optical encoder of claim 1, wherein the width dimension DW is at least as large as $2*P_{PF}$ along the direction of the fringe displacement.

16. The optical encoder of claim 1, wherein the width dimension DW is at least as large as $3*P_{PF}$ along the direction of the fringe displacement.

* * * * *

UNITED STATES PATENT AND TRADEMARK OFFICE
CERTIFICATE OF CORRECTION

PATENT NO. : 9,651,404 B2
APPLICATION NO. : 14/869347
DATED : May 16, 2017
INVENTOR(S) : Yong Xie It is certified that error appears in the above-identified patent and that said Letters Patent is hereby corrected as shown below:

In the Claims

Column 11, Line 4:

"$ABW \leq BMAX * f * \tan(\arcsin\left[\frac{\lambda}{P_{SF}}\right]$" should read, --$ABW \leq BMAX * f * \tan(\arcsin\left[\frac{\lambda}{P_{SF}}\right])$;--.

Column 11, Line 15:

"$ABW \geq BMIN * f * \tan(\arcsin\left[\frac{\lambda}{P_{SF}}\right]$" should read, --$ABW \geq BMIN * f * \tan(\arcsin\left[\frac{\lambda}{P_{SF}}\right])$;--.

Column 12, Line 2:

"$AW \geq KMIN * f * \tan(\arcsin\left[\frac{\lambda}{P_{SF}}\right]$" should read, --$AW \geq KMIN * f * \tan(\arcsin\left[\frac{\lambda}{P_{SF}}\right])$;--.

Column 12, Line 13:

"$AW \leq KMAX * f * \tan(\arcsin\left[\frac{\lambda}{P_{SF}}\right]$" should read, --$AW \leq KMAX * f * \tan(\arcsin\left[\frac{\lambda}{P_{SP}}\right])$;--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*